United States Patent
Katayama et al.

(10) Patent No.: US 6,800,002 B2
(45) Date of Patent: Oct. 5, 2004

(54) VALVE TIMING CONTROL FOR MARINE ENGINE

(75) Inventors: Goichi Katayama, Shizuoka (JP); Yoshibumi Iwata, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/188,691

(22) Filed: Jul. 2, 2002

(65) Prior Publication Data

US 2003/0003824 A1 Jan. 2, 2003

(30) Foreign Application Priority Data

Jul. 2, 2001 (JP) ........................................ 2001-200429

(51) Int. Cl.$^7$ .............................................. B63H 23/00
(52) U.S. Cl. ........................... 440/1; 123/90.17; 440/75
(58) Field of Search ........................... 440/1, 75, 88 A, 440/88 F; 123/90.15, 90.17; 477/107, 109, 110, 111, 112

(56) References Cited

U.S. PATENT DOCUMENTS

| | | | |
|---|---|---|---|
| 4,428,734 A | * | 1/1984 | Ludlow ........................ 440/75 |
| 5,012,773 A | | 5/1991 | Akasaka et al. |
| 5,056,378 A | * | 10/1991 | Aimone et al. ............. 477/109 |
| 5,058,539 A | | 10/1991 | Saito et al. |
| 5,111,780 A | | 5/1992 | Hannibal |
| 5,133,310 A | | 7/1992 | Hitomi et al. |
| 5,143,034 A | | 9/1992 | Hirose |
| 5,150,675 A | | 9/1992 | Murata |
| 5,184,581 A | | 2/1993 | Aoyama et al. |

(List continued on next page.)

FOREIGN PATENT DOCUMENTS

| | | |
|---|---|---|
| EP | 0 356 162 A1 | 2/1990 |
| EP | 0 699 831 A2 | 3/1996 |
| EP | 0 808 997 A1 | 11/1997 |
| EP | 0 829 621 A2 | 3/1998 |
| JP | 10-18871 | 1/1998 |

OTHER PUBLICATIONS

Co-pending application No. 09/494395, entitled Engine Idle Control System, filed on Jan. 31, 2000 in the name of Isao Kanno et al. and assigned to Sanshin Kogyo Kabushiki Kaisha.

Co-pending application No. 10/078,275, entitled Control System for Marine Engine, filed on Feb. 14, 2002 in the name of Isao Kanno and assigned to Sanshin Kogyo Kabushiki Kaisha.

*Primary Examiner*—Sherman Basinger
(74) *Attorney, Agent, or Firm*—Knobbe, Martens, Olson & Bear, LLP

(57) ABSTRACT

A marine drive has an engine, a propeller and a transmission to switch the propeller between a propulsion position and a non-propulsion position. The engine has a combustion chamber. An air induction system communicates with the combustion chamber through an intake port. An exhaust system communicates with the combustion chamber through an exhaust port. Intake and exhaust valves move between an opening position and a closing position of the intake port and the exhaust port, respectively. Intake and exhaust camshafts actuate the intake and exhaust valves, respectively. A VVT mechanism changes an actuating timing of the intake camshaft at which the camshaft actuates the intake valve. An ECU controls the intake camshaft to set the actuating timing at a generally optimum timing. A transmission position change operation sensor senses that the transmission is under operation and sends a signal to the ECU. The ECU controls the VVT mechanism based upon the signal to move the actuating timing away from the optimum timing. Otherwise, a transmission position sensor senses that the transmission is in a neutral position and sends a signal to the ECU. The ECU controls the VVT mechanism based upon the signal to bring the actuating timing to a generally fully retarded timing.

16 Claims, 9 Drawing Sheets

U.S. PATENT DOCUMENTS

| | | |
|---|---|---|
| 5,189,999 A | 3/1993 | Thoma |
| 5,301,639 A | 4/1994 | Satou |
| 5,305,718 A | 4/1994 | Muller |
| 5,353,755 A | 10/1994 | Matsuo et al. |
| 5,458,099 A | 10/1995 | Koller et al. |
| 5,474,038 A | 12/1995 | Golovatai-Schmidt et al. |
| 5,540,197 A | 7/1996 | Golovatai-Schmidt et al. |
| 5,606,941 A | 3/1997 | Trzmiel et al. |
| 5,606,952 A | 3/1997 | Kanno et al. |
| 5,628,286 A | 5/1997 | Kato et al. |
| 5,669,343 A | 9/1997 | Adachi |
| 5,713,319 A | 2/1998 | Tortul |
| 5,718,196 A | 2/1998 | Uchiyama et al. |
| 5,758,612 A | 6/1998 | Tsuzuku et al. |
| 5,797,363 A | 8/1998 | Nakamura |
| 5,799,631 A | 9/1998 | Nakamura |
| 5,813,377 A | 9/1998 | Matsunaga |
| 5,826,560 A | 10/1998 | Ito |
| 5,829,399 A | 11/1998 | Scheidt et al. |
| 5,836,274 A | 11/1998 | Saito et al. |
| 5,855,190 A | 1/1999 | Matsunaga |
| 5,913,298 A | 6/1999 | Yoshikawa |
| 5,954,019 A | 9/1999 | Yoshikawa et al. |
| 6,015,319 A | 1/2000 | Tanaka |
| 6,032,629 A | 3/2000 | Uchida |
| 6,035,817 A | 3/2000 | Uchida |
| 6,076,492 A | 6/2000 | Takahashi |
| 6,116,228 A | 9/2000 | Motose et al. |
| 6,186,105 B1 | 2/2001 | Yonezawa |
| 6,189,498 B1 | 2/2001 | Yonezawa et al. |
| 6,250,266 B1 | 6/2001 | Okui et al. |
| 6,289,861 B1 | 9/2001 | Suzuki |
| 6,325,031 B1 | 12/2001 | Takano |
| 6,343,580 B2 | 2/2002 | Uchida |
| 6,343,581 B2 | 2/2002 | Suzuki |
| 6,352,061 B2 * | 3/2002 | Takahashi ............... 123/90.15 |
| 6,354,277 B1 | 3/2002 | Kato |
| 6,357,405 B1 | 3/2002 | Tsuji et al. |
| 6,439,938 B1 * | 8/2002 | Katayama ............... 440/88 R |
| 2001/0023155 A1 * | 9/2001 | Shidara et al. ............... 440/1 |
| 2002/0017277 A1 | 2/2002 | Kanno |
| 2002/0155921 A1 * | 10/2002 | Schwarzenthal et al. ...... 477/90 |

* cited by examiner

VALVE TIMING CONTROL FOR MARINE ENGINE

PRIORITY INFORMATION

This application is based on and claims priority to Japanese Patent Application No. 2001-200429, filed Jul. 2, 2001, the entire contents of which is hereby expressly incorporated by reference.

BACKGROUND OF THE INVENTION

1. Field of the Invention

The present invention is directed to a valve timing control for a marine drive, and more particularly to an improved valve timing control for a marine drive that includes a variable valve timing mechanism.

2. Description of Related Art

A marine drive such as an outboard motor has a marine propulsion device powered by an engine. The propulsion device typically is a propeller and is submerged when an associated watercraft rests on a body of water. The outboard motor can employ either a two-cycle engine or a four-cycle engine. Recently, however, many outboard motors are offered with four-cycle engines because they provide better emissions control.

Typically, a four-cycle engine includes one or more intake and exhaust valves moving between an open position and a closed position. One or more camshafts can be provided to actuate the valves in a timed manner. When the intake valves are open, air is introduced into combustion chambers of the engine through the intake ports. When the exhaust valves are open, exhaust gases are discharged from the combustion chambers through the exhaust ports.

The engine typically includes one or more throttle valves to regulate an amount of air delivered to the combustion chambers. The throttle valves can be operated by the operator with a throttle lever. In general, the more the throttle valves open, the more power is output from the engine.

The engine can include a hydraulically operated variable valve timing (VVT) mechanism that can change opening and closing timing of the respective valves by changing an angular position of the camshaft or camshafts. A control device such as, for example, an electronic control unit (ECU) is used to control the VVT mechanism under various control strategies. For instance, the ECU controls the VVT mechanism either to set the valve timing at a fully advanced position for relatively high engine speeds to ensure high charging efficiency and high performance of the engine, or to set the valve timing at a fully retarded position for relatively low engine speeds to ensure high combustion efficiency, fuel economy and good emission control. Otherwise, the ECU controls the VVT mechanism to set the valve timing at a position between the fully advanced position and the fully retarded position in response to a running condition of the engine. Typically, the control by the ECU is a feedback control such that the ECU gives a target valve timing and controls the VVT mechanism to bring an actual valve timing close to the target valve timing.

Typically, the marine drive is provided with a transmission or transmission that changes a rotational direction of the propeller between forward, neutral or reverse. The transmission typically comprises a dog clutch and shift unit that operates the dog clutch. When in the forward and reverse positions, which are propulsion positions, the propeller propels the watercraft forward and backward, respectively. In the neutral position, which is a non-propulsion position, the propeller does not propel the watercraft because the propulsion shaft 226 is disconnected from the driveshaft.

When an engine is operating at idle speed with minimal load, it can exert considerable torque without movement of the throttle valve. For example, when a marine drive such as an outboard or inboard/outboard motor is at idle speed, the power output of the engine makes it difficult to move the transmission shift lever due to the load imparted to the transmission components. Additionally, when the transmission is shifted to a drive position, the engine is suddenly loaded and causes the propeller to begin to rotate almost instantaneously. The sudden movement of the propeller sends a shock through the drive train. This shock causes fatigue in the drive train and can make passengers in the associated watercraft feel uncomfortable. The shock is more severe and more noticeable when the marine drive is powered by a four-cycle engine.

SUMMARY OF THE INVENTION

One aspect of the present invention includes the realization that although variable valve timing mechanisms can be used to enhance the efficiency and thus increase the power output of internal combusion engines, they can also be used to reduce the power output of an engine. For example, in one mode, a VVT mechanism can be adjusted to an advanced intake valve timing during idle speed operation to reduce the power output and speed of the engine. As such, the load on the transmission can be reduced thereby allowing the transmission to be shifted more easily. Additionally, the reduced power output of the engine reduces the shock imparted to the drive train and the passengers of the associated watercraft.

Another aspect of the invention includes the realization that, under certain conditions, it is more beneficial to prevent adjustment of the valve timing. For example, sometimes a user may find it necessary or desirable to "race" the engine while the transmission is in the neutral position. In other words, a user may choose to actuate the throttle to increase the engine speed without causing the associated watercraft to move. A user might choose to race the engine in this manner to warm the engine more quickly, to un-foul a spark plug, to determine if a cylinder is mis-firing, or other reasons. Normally, the VVT mechanism would adjust the valve timing to follow a target timing when an engine is raced as such. However, if the valve timing is adjusted normally while the transmission is in neutral, the VVT mechanism may not be able to achieve a desired angular position immediately when the transmission is shifted into a drive position. Thus, a time lag can be generated causing the engine to temporarily operate in a compromised condition.

In accordance with one aspect of the present invention, a marine drive comprises an internal combustion engine. A propulsion device is powered by the engine. A transmission is arranged to switch the propulsion device between a propulsion position and a non-propulsion position. The engine comprises an engine body. A movable member is movable relative to the engine body. The engine body and the movable member together define a combustion chamber. The engine body defines intake and exhaust ports communicating with the combustion chamber. An air induction system communicates with the combustion chamber through the intake port. An exhaust system communicates with the combustion chamber through the exhaust port. An intake valve is arranged to move between an opening position and a closing position of the intake port. An exhaust valve is arranged to move between an opening position and a closing position of the exhaust port. A valve actuator is arranged to actuate either the intake valve or the exhaust valve. A change mechanism is arranged to change an actuating timing of the valve actuator at which the valve actuator actuates the intake valve or the exhaust valve. A control device is configured to control the change mechanism to set the actuating timing at a generally optimum timing. A sensor senses that the transmission is under operation and sending a signal to the control device. The control device controls the change mechanism based upon the signal to move the actuating timing away from the optimum timing.

In accordance with another aspect of the present invention, a marine drive comprises an internal combustion engine. A propulsion device is powered by the engine. A transmission is arranged to switch the propulsion device between a propulsion position and a non-propulsion position. The engine comprises an engine body. A movable member is movable relative to the engine body. The engine body and the movable member together define a combustion chamber. The engine body defines intake and exhaust ports communicating with the combustion chamber. An air induction system communicates with the combustion chamber through the intake port. An exhaust system communicates with the combustion chamber through the exhaust port. An intake valve is arranged to move between an opening position and a closing position of the intake port. An exhaust valve is arranged to move between an opening position and a closing position of the exhaust port. A valve actuator is arranged to actuate either the intake valve or the exhaust valve. A change mechanism is arranged to change an actuating timing of the valve actuator at which the valve actuator actuates the intake valve or the exhaust valve. A control device is configured to control the change mechanism to set the actuating timing at a generally optimum timing. A sensor is configured to sense whether the propulsion device is in the non-propulsion position and to send a signal to the control device. The control device is configured to control the change mechanism based upon the signal to adjust the actuating timing of the actuator toward a generally fully retarded or advanced timing.

A further aspect of the present invention is directed to a method for controlling a marine drive having a transmission configured to shift a propulsion device between a propulsion position and a non-propulsion position, an internal combustion engine including intake and exhaust valves, a valve actuator configured to actuate the intake and exhaust valves, and a change mechanism configured to change an actuating timing of the valve actuator at which the valve actuator actuates at least one of the intake valve and the exhaust valve. The method comprises setting the actuating timing at a first timing, determining whether the transmission is being shifted, and controlling the change mechanism to move the actuating timing away from the first timing when the determination is affirmative.

Yet another aspect of the invention is directed to a method for controlling a marine drive having a propulsion device, an internal combustion engine including intake and exhaust valves, a valve actuator configured to actuate the intake and exhaust valves, and a change mechanism configured to change an actuating timing of the valve actuator at which the valve actuator actuates at least one of the intake valve and the exhaust valve. The method comprises setting the actuating timing at a generally optimum timing, sensing whether the propulsion device is in a non-propulsion position, and controlling the change mechanism to bring the actuating timing to a generally fully retarded or advanced position when the determination is affirmative.

In accordance with another aspect of the invention, a marine drive comprises an internal combustion engine, a propulsion device powered by the engine, and a transmission configured to be shift the propulsion device between a neutral position and a drive position. The engine comprises an engine body, a movable member movable relative to the engine body, wherein the engine body and the movable member together defining a combustion chamber. The engine body also defines intake and exhaust ports communicating with the combustion chamber. An air induction system communicates with the combustion chamber through the intake port. An exhaust system communicates with the combustion chamber through the exhaust port. An intake valve is arranged to move between an open position and a closed position of the intake port. An exhaust valve is configured to move between an open position and a closed position of the exhaust port. A valve actuator is configured to actuate either the intake valve or the exhaust valve. Additionally, the engine includes means for changing an actuating timing of the valve actuator so as to reduce a load on the transmission while the transmission is being shifted.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise nine figures.

DETAILED DESCRIPTION OF THE PREFERRED EMBODIMENTS OF THE INVENTION

Figure 1:
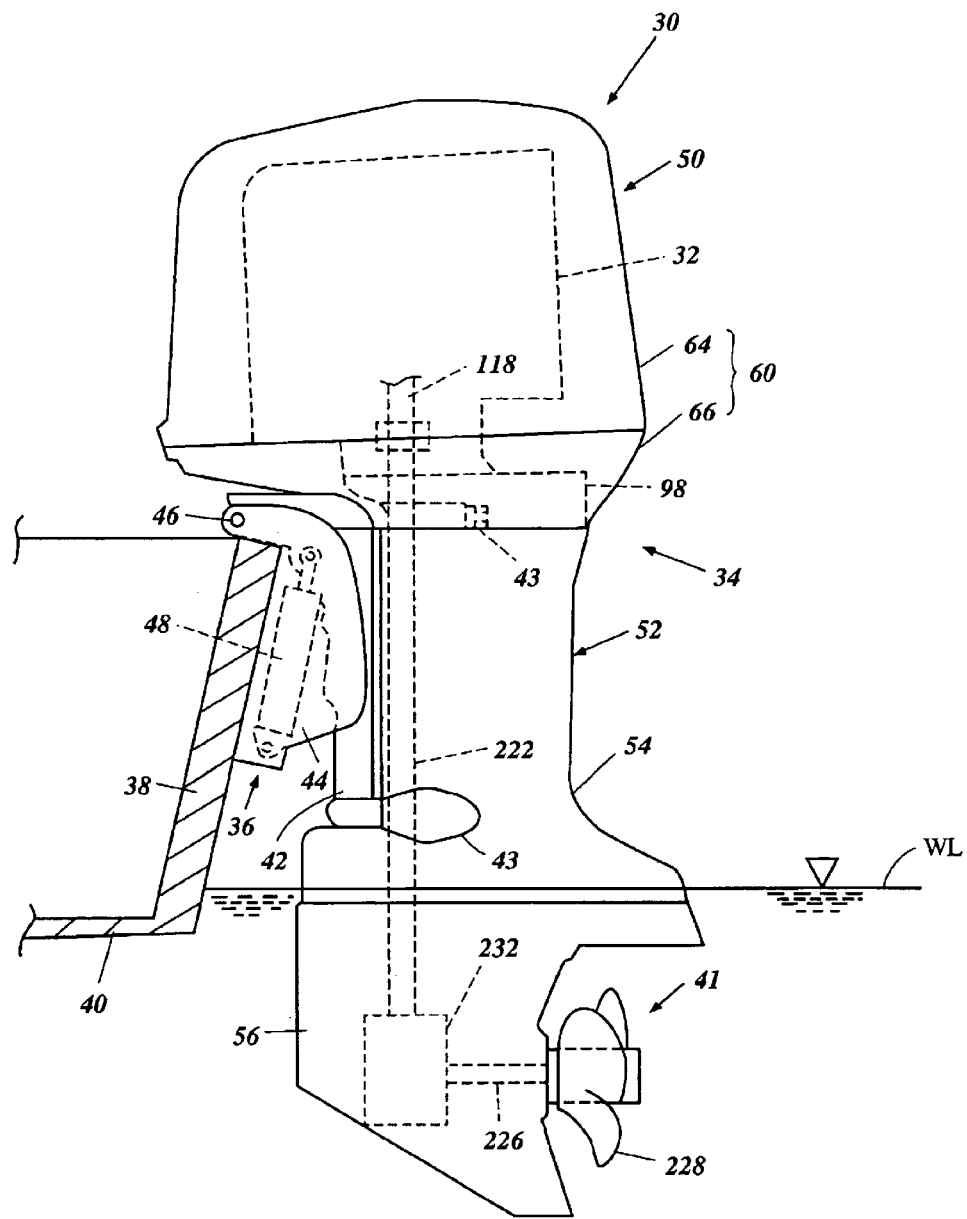
FIG. 1 is a side elevational view of an outboard motor configured in accordance with a preferred embodiment of the present invention, with an engine and drive trail shown in phantom and an associated watercraft partially shown in section.

With reference to FIGS. 1–5, an overall construction of an outboard motor 30 that employs an internal combustion engine 32 configured in accordance with certain features, aspects and advantages of the present invention is described below. The engine 32 has particular utility in the context of a marine drive, such as the outboard motor, and thus is described in the context of an outboard motor. The engine 32, however, can be used with other types of marine drives (i.e., inboard motors, inboard/outboard motors, jet drives, etc.) and also certain land vehicles. In any of these applications, the engine 32 can be oriented vertically or horizontally. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device 41 in a submerged position when the watercraft 40 rests on a surface of a body of water WL. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies 43. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52 which includes a driveshaft housing 54 and a lower unit 56. The power head 50 is disposed atop the drive unit 34 and includes the internal combustion engine 32 and a protective cowling assembly 60. Preferably, the protective cowling 60, which preferably is made of plastic, defines a generally closed cavity 62 (FIGS. 2–4) in which the engine 32 is disposed. The protective cowling assembly 60 preferably comprises a top cowling member 64 and a bottom cowling member 66. The top cowling member 64 preferably is detachably affixed to the bottom cowling member 66 by a coupling mechanism so that a user, operator, mechanic or repair person can access the engine 32 for maintenance or for other purposes.

Figure 2:
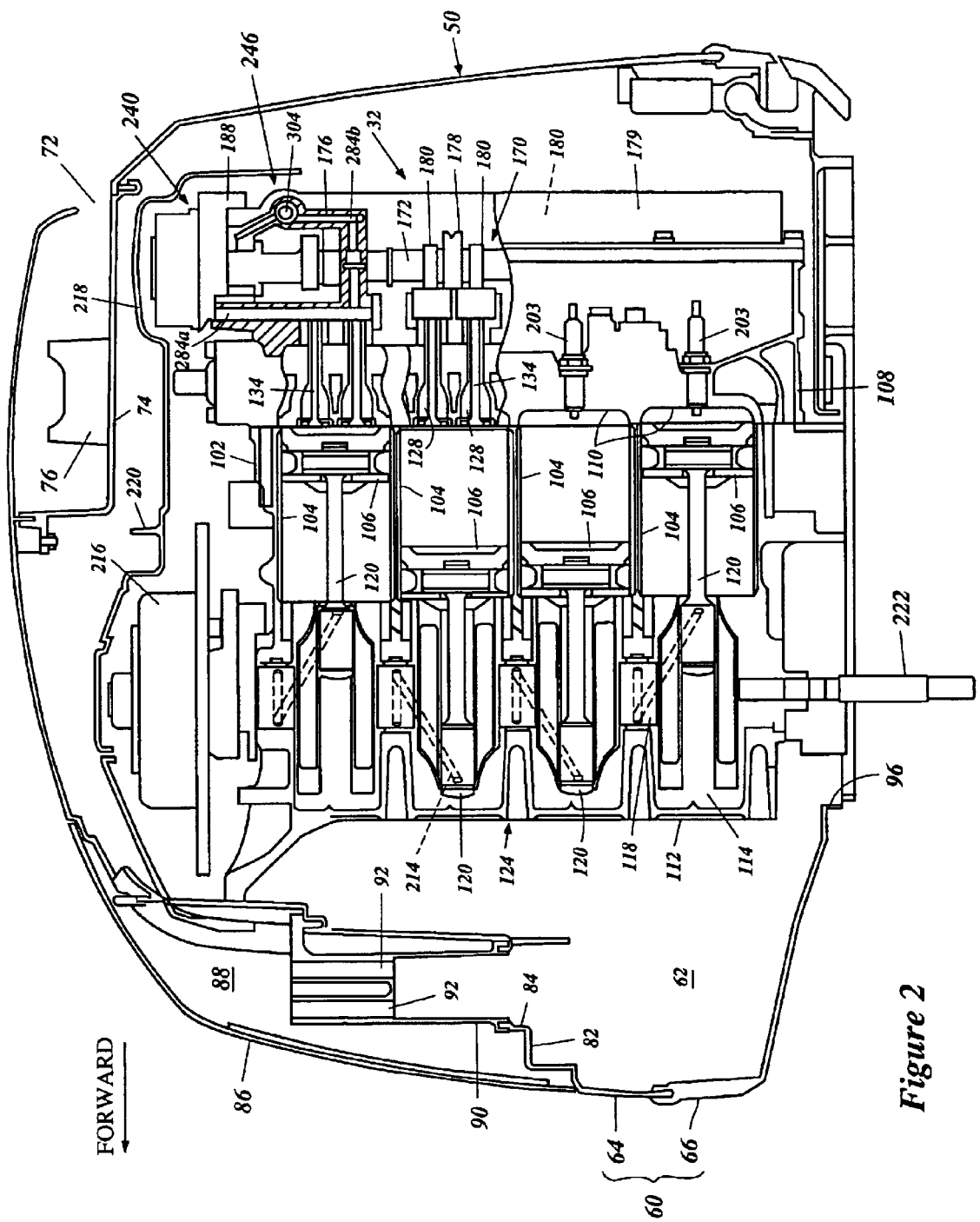
FIG. 2 is an enlarged partial sectional and port a side elevational view of an upper section of an outboard motor configured in accordance with a preferred embodiment of the present invention, with various parts shown in phantom.
Figure 4:
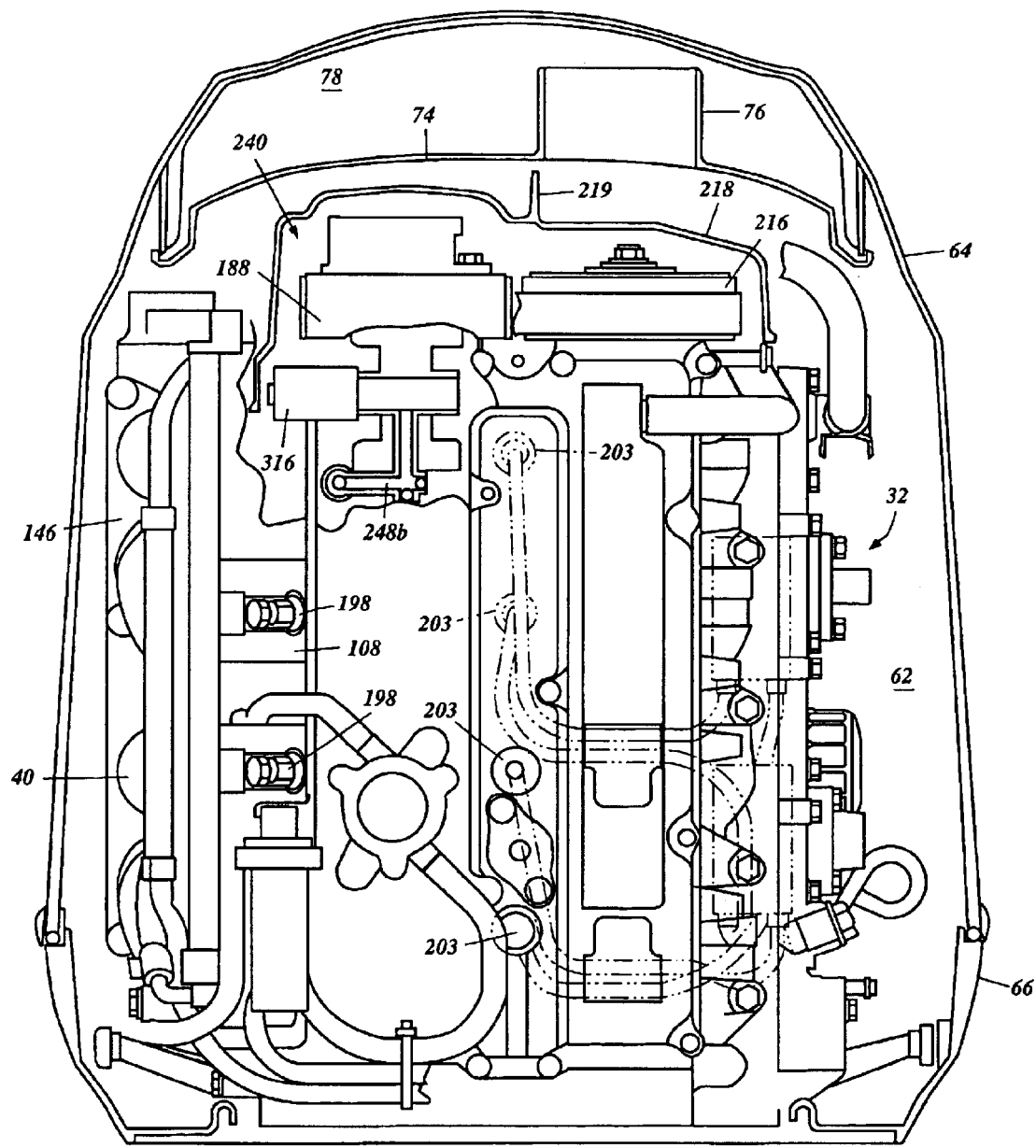
FIG. 4 is a rear elevational view of an upper section of an outboard motor configured in accordance with a preferred embodiment of the present invention, with the cowling shown in section.

With reference to FIG. 2, the top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. With particular reference to FIG. 4, the rear air duct 76 preferably is disposed to the starboard side of a central portion of the rear intake member 74.

With reference to FIG. 2, the top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 (FIG. 2) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

Figure 3:
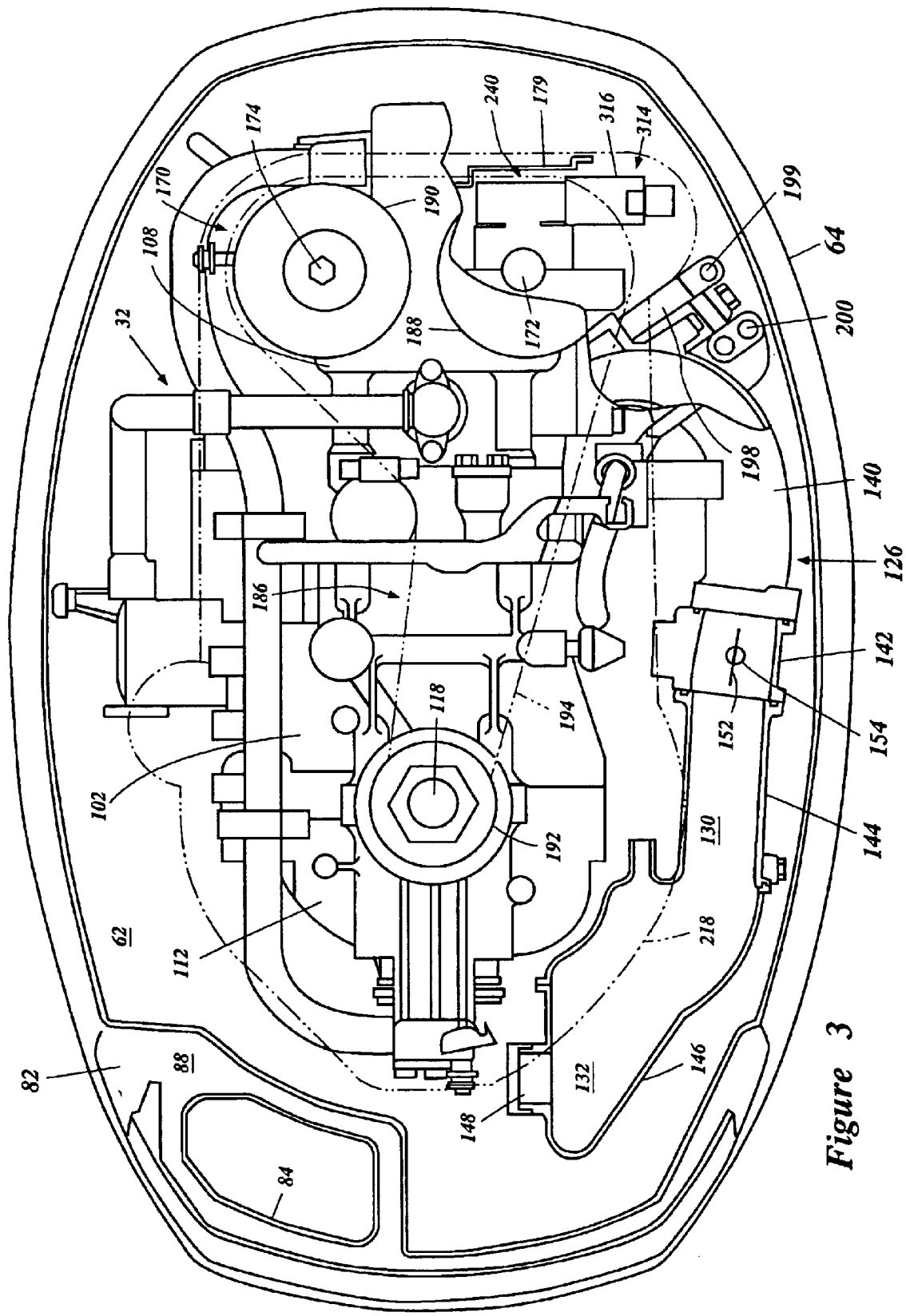
FIG. 3 is a top plan view of an outboard motor configured in accordance with a preferred embodiment of the present invention, with a cowling shown in section and a portion of the engine also shown in section.

With reference to FIGS. 2–4, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line WL when the associated watercraft 40 is substantially stationary with respect to the water line WL and when the drive unit 34 is not tilted and is placed in the position shown in FIG. 1. The term "vertically" in turn means that portions, members or components extend generally normal to those that extend horizontally.

This type of engine, however, merely exemplifies one type of engine on which various aspects and features of the present invention can be suitably used. Engines having other numbers of cylinders, having other cylinder arrangements (V, opposing, etc.), and operating on other combustion principles (e.g., crankcase compression two-stroke or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A moveable member, such as a reciprocating piston 106, moves relative to the cylinder block 102 in a suitable manner. In the illustrated arrangement, the piston 106 reciprocates within each cylinder bore 104.

A cylinder head member 108 is affixed to one end of the cylinder block 102 to close one end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the forward most position of the engine 32, with the cylinder block 102 and the cylinder head member 108 being disposed rearward from the crankcase member 112. Generally, the cylinder block 102 (or individual cylinder bodies), the cylinder head member 108 and the crankcase member 112 together define an engine body 124. Preferably, at least these major engine portions 102, 108, 112 are made of an aluminum alloy. The aluminum alloy advantageously increases strength over cast iron while decreasing the weight of the engine body 96.

The engine 32 also comprises an air induction system or device 126. The air induction system 126 draws air from within the cavity 62 to the combustion chambers 110. The air induction system 126 preferably comprises eight intake ports 128, four intake passages 130 and a single plenum chamber 132. In the illustrated arrangement, two intake ports 128 are allotted to each combustion chamber 110 and the two intake ports 128 communicate with a single intake passage 130.

The intake ports 128 are defined in the cylinder head member 108. Intake valves 134 are slidably disposed at the intake ports 128 within the cylinder head member 108 to move between an open and a closed position. As such, the valves 134 act to open and close the ports 128 to control the flow of air into the combustion chamber 110.

Biasing members, such as springs 136 (FIG. 5), are used to urge the intake valves 134 toward the respective closed positions by acting against a mounting boss formed on the illustrated cylinder head member 108 and a corresponding retainer 138 that is affixed to each of the valves 134. When each intake valve 134 is in the open position, the intake passage 130 that is associated with the intake port 128 communicates with the associated combustion chamber 110.

With reference to FIG. 3, each intake passage 130 preferably is defined by an intake manifold 140, a throttle body 142 and an intake runner 144. The intake manifold 140 and the throttle body 142 preferably are made of aluminum alloy. The intake runner 144 preferably is made of plastic. A portion of the illustrated intake runner 144 extends forwardly alongside of and to the front of the crankcase member 112.

With continued reference to FIG. 3, the respective portions of the intake runners 144, together with a plenum chamber member 146, define the plenum chamber 132. Preferably, the plenum chamber member 146 also is made of plastic.

The plenum chamber 132 comprises an air inlet 148. The air in the cavity 62 is drawn into the plenum chamber 132 through the air inlet 148. The air is then passed through intake passages 130, the throttle body 142 and the intake manifold 140. Preferably, the plenum chamber 132 acts as an intake silencer to attenuate noise generated by the flow of air into the respective combustion chambers 110.

Each illustrated throttle body 142 has a butterfly type throttle valve 152 journaled for pivotal movement about an axis defined by a generally vertically extending valve shaft 154. Each valve shaft 154 can be coupled with the other valve shafts to allow simultaneous movement. The valve shaft 154 is operable by the operator through an appropriate conventional throttle valve linkage and a throttle lever connected to the end of the linkage. The throttle valves 152 are movable between an open position and a closed position to meter or regulate an amount of air flowing through the respective air intake passages 130. Normally, the greater the opening degree, the higher the rate of airflow and the higher the power output of the engine speed.

In order to bring the engine 32 to idle speed and to maintain this speed, the throttle valves 152 generally are substantially closed. Preferably, the valves are not fully closed to produce a more stable idle speed and to prevent sticking of the throttle valves 152 in the closed position. As used through the description, the term "idle speed" generally means a low engine speed that achieved when the throttle valves 152 are closed but also includes a state such that the valves 152 are slightly more open to allow a relatively small amount of air to flow through the intake passages 130.

The air induction system 126 preferably includes an auxiliary air device (AAD) (not shown) that bypasses the throttle valves 152 and extends from the plenum chamber 132 to the respective intake passages 130 downstream of the throttle valves 152. Idle air can be delivered to the combustion chambers 110 through the AAD when the throttle valves 152 are placed in a substantially closed or closed position.

The AAD preferably comprises an idle air passage, an idle valve and an idle valve actuator. The idle air passage is branched off to the respective intake passages 130. The idle valve controls flow through the idle air passage such that the amount of air flow can be more precisely controlled. Preferably, the idle valve is a needle valve that can move between an open position and a closed position, which closes the idle air passage. The idle valve actuator actuates the idle valve to a certain position to meter or adjust an amount of the idle air.

Figure 8:
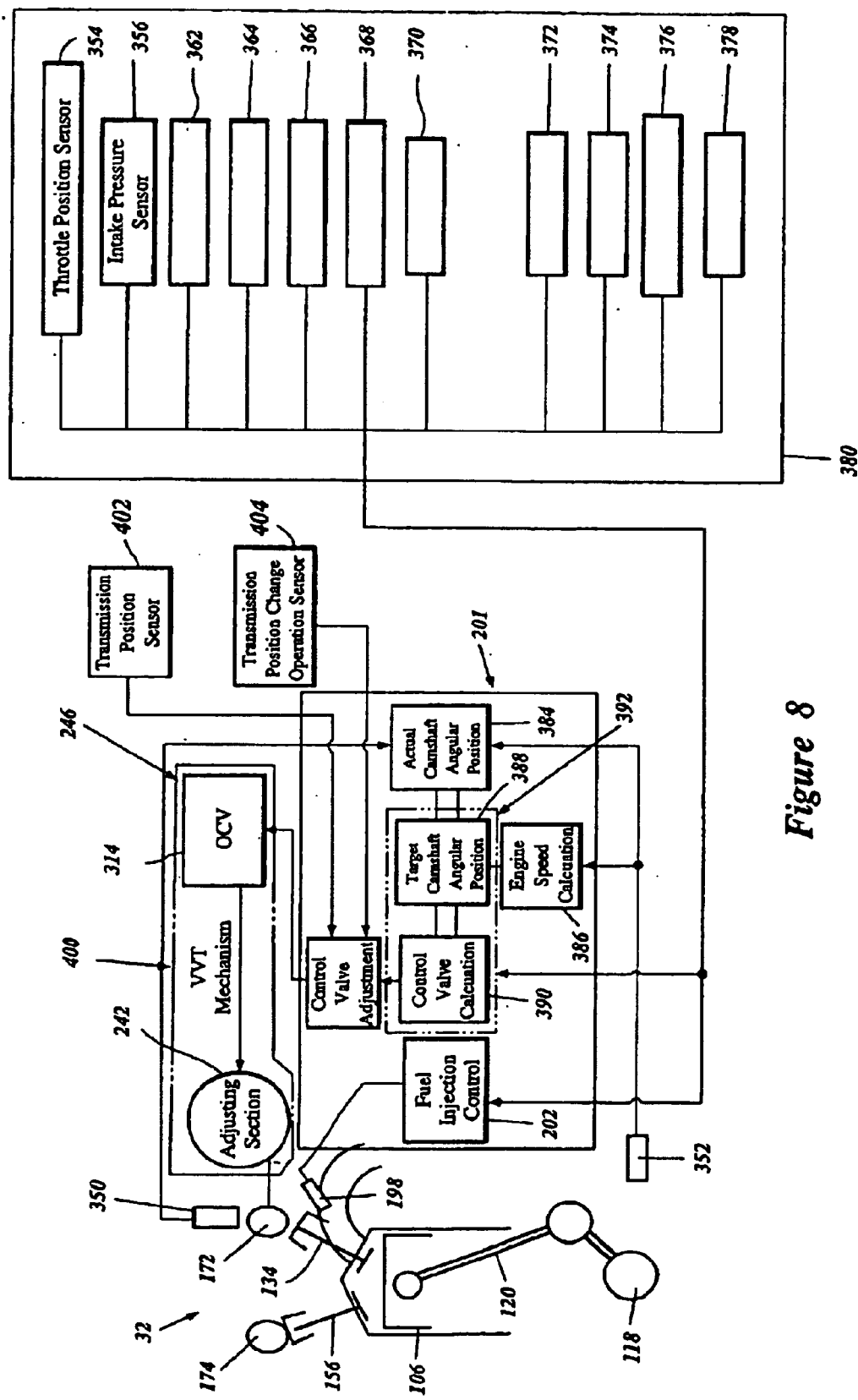
FIG. 8 is a block diagram of an engine operating system and various engine components.

The engine 32 also comprises an exhaust system that routes burnt charges, i.e., exhaust gases, to a location outside of the outboard motor 30. Each cylinder bore 104 preferably has two exhaust ports (not shown) defined in the cylinder head member 108. The exhaust ports can be selectively opened and closed by exhaust valves. The exhaust valves are schematically illustrated in FIG. 8, described below, and identified by reference numeral 156. The construction of each exhaust valve and the arrangement of the exhaust valves are substantially the same as the intake valves 134 and the arrangement thereof, respectively.

An exhaust manifold (not shown) preferably is disposed next to the exhaust ports (not shown) and extends generally vertically. The exhaust manifold communicates with the combustion chambers 110 through the exhaust ports to collect exhaust gases therefrom. The exhaust manifold is coupled with the foregoing exhaust passage of the exhaust guide member 98. When the exhaust ports are opened, the combustion chambers 110 communicate with the exhaust passage through the exhaust manifold.

Figure 5:
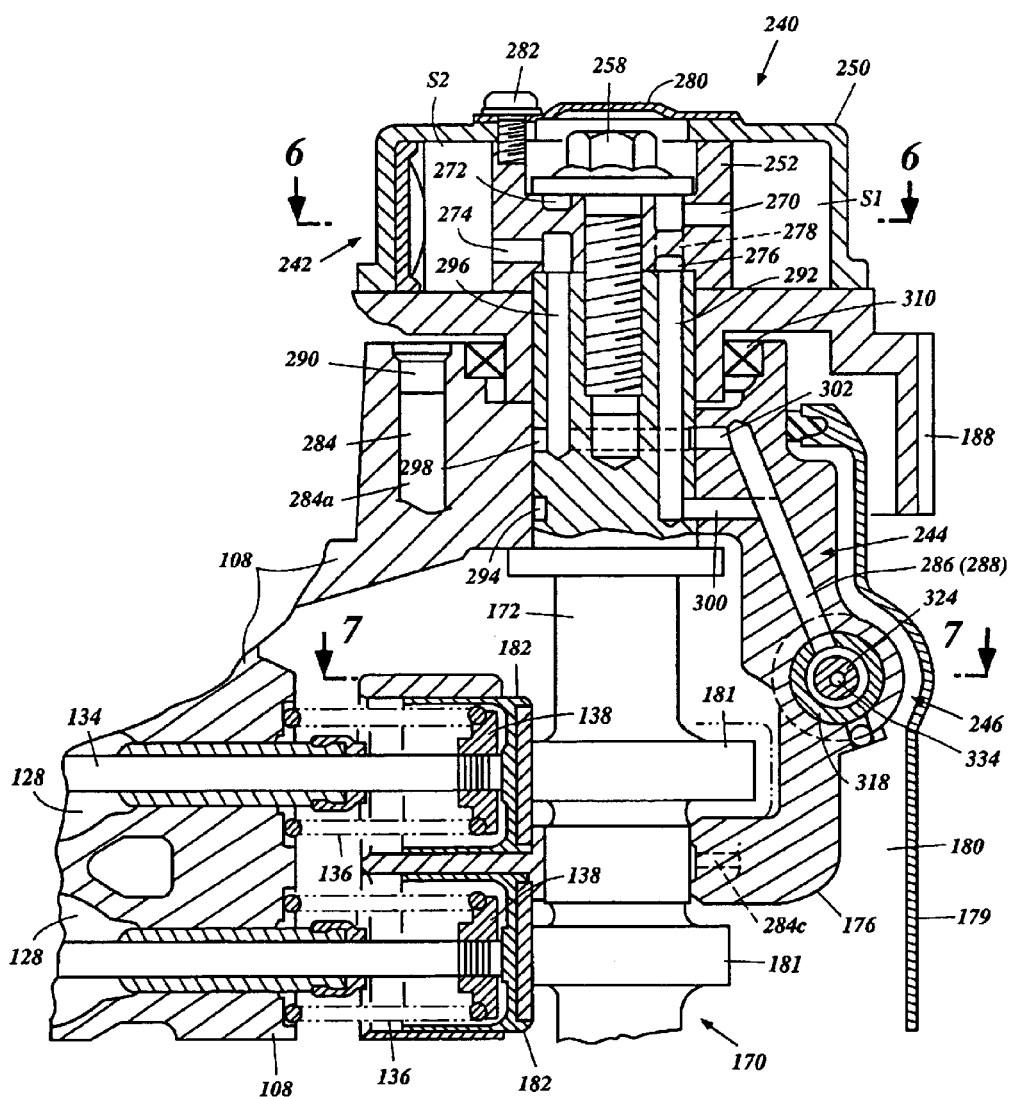
FIG. 5 is an enlarged sectional view of a cylinder head showing a variable camshaft adjusting mechanism.

With particular reference to FIGS. 2, 3 and 5, a valve cam mechanism or valve actuator 170 preferably is provided for actuating the intake valves 134 and the exhaust valves 156 (FIG. 8). In the illustrated arrangement, the valve cam mechanism 170 includes an intake camshaft 172 and an exhaust camshaft 174 both extending generally vertically and journaled for rotation relative to the cylinder head member 108. In the illustrated arrangement, bearing caps 176, 178 (FIG. 2) journal the camshafts 172, 174 with the cylinder head member 108. A camshaft cover 179 is affixed to the cylinder head member 108 to define a camshaft chamber 180 together with the cylinder head member 108.

Each camshaft 172, 174, as shown in FIG. 5, has cam lobes 181 to push valve lifters 182 that are affixed to the respective ends of the intake valves 134 and exhaust valves 156 (FIG. 8) as in any suitable manner. The cam lobes 181 repeatedly push the valve lifters 182 in a timed manner, which is in proportion to the engine speed. The movement of the lifters 182 generally is timed by the rotation of the camshafts 172, 174 to actuate the intake valves 134 and the exhaust valves.

With reference to FIG. 3, a camshaft drive mechanism 186 drives the valve cam mechanism 170. The intake camshaft 172 and the exhaust camshaft 174 include an intake driven sprocket 188 positioned atop the intake camshaft 172 and an exhaust driven sprocket 190 positioned atop the exhaust camshaft 174. The crankshaft 118 has a drive sprocket 192 positioned at an upper portion thereof. Of course, other locations of the sprockets also can be used. The illustrated arrangement, however, advantageously results in a compactly arranged engine.

A timing chain or belt 194 is wound around the driven sprockets 188, 190 and the drive sprocket 192. The crankshaft 118 thus drives the respective camshafts 172, 174 through the timing chain 194 in the timed relationship. Because the camshafts 172, 174 must rotate at half of the speed of the rotation of the crankshaft 118 in the four-cycle combustion principle, a diameter of the driven sprockets 188, 190 is twice as large as a diameter of the drive sprocket 192.

With reference to FIGS. 3 and 4, the engine 32 preferably has a port or manifold fuel injection system. The fuel injection system preferably comprises four fuel injectors 198 with one fuel injector allotted for each of the respective combustion chambers 110 through suitable fuel conduits 199. The fuel injectors 198 are mounted on a fuel rail 200, which is mounted on the cylinder head member 108. The fuel rail 200 also defines a portion of the fuel conduits 199. Each fuel injector 198 preferably has an injection nozzle directed toward the associated intake passage 130 adjacent to the intake ports 134.

The fuel injectors 198 spray fuel into the intake passages 130 under control of an ECU which preferably is mounted on the engine body 124 at an appropriate location. The ECU 201 (FIG. 8) controls both the start timing and the duration of the fuel injection cycle of the fuel injectors 198 so that the nozzles spray a proper amount of the fuel for each combustion cycle. The fuel injection controller within the ECU 201 is illustrated in FIG. 8 with reference numeral 202 and is described below. Of course, the fuel injectors 198 can be disposed for direct cylinder injection and carburetors can replace or accompany the fuel injectors 198.

With reference to FIGS. 2 and 4, the engine 32 further comprises an ignition or firing system. Each combustion chamber 110 is provided with a spark plug 203 that is connected to the ECU 201 (FIG. 8) through an igniter so that ignition timing is also controlled by the ECU 201. Each spark plug 203 has electrodes that are exposed into the associated combustion chamber and are spaced apart from each other with a small gap. The spark plugs 203 generate a spark between the electrodes to ignite an air/fuel charge in the combustion chamber 110 at selected ignition timing under control of the ECU 201.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves 156 (FIG. 8) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 203 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the body of water. The cooling system includes one or more water jackets defined within the engine body 124 through which the water travels to remove heat from the engine body 124.

The engine 32 also preferably includes a lubrication system. A closed-loop type system is employed in the illustrated embodiment. The lubrication system comprises a lubricant tank defining a reservoir, which preferably is positioned within the driveshaft housing 54. An oil pump (not shown) is provided at a desired location, such as atop the driveshaft housing 54, to pressurize the lubricant oil in the reservoir and to pass the lubricant oil through a suction pipe toward certain engine portions, which desirably are lubricated, through lubricant delivery passages. The engine portions that need lubrication include, for example, the crankshaft bearings (not shown), the connecting rods 120 and the pistons 106. Portions 214 of the delivery passages (FIG. 2) can be defined in the crankshaft 118. Lubricant return passages (not shown) also are provided to return the oil to the lubricant tank for re-circulation.

A flywheel assembly 216 (FIG. 2) preferably is positioned at an upper end of the crankshaft 118 and is mounted for rotation with the crankshaft 118. The flywheel assembly 216 comprises a flywheel magneto or AC generator that supplies electric power to various electrical components such as the fuel injection system, the ignition system and the ECU 201 (FIG. 8). A protective cover 218, which preferably is made of plastic, extends over majority of the top surface of the engine 32 and preferably covers the portion that includes the fly wheel assembly 216 and the camshaft drive mechanism 186.

The protective cover 218 preferably has a rib 219 (FIG. 4) that reduces or eliminates the amount of air flowing directly toward the engine portion that has the air induction system 126, i.e., to the portion on the starboard side. The protective cover 218 also preferably has a rib 220 (FIG. 2) that substantially or completely inhibits air from flowing directly toward a front portion of the engine body 124. The ribs 219, 222 advantageously help direct the airflow around the engine body 124 to cool the engine body 124. As seen in FIG. 2, a bottom portion, at least in part, of the protective cover 218 desirably is left open to allow heat to radiate from the engine 32.

With reference to FIG. 1, the driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

With continued reference to FIG. 1, the lower unit 56 depends from the driveshaft housing 54 and supports a propulsion shaft 226 that is driven by the driveshaft 222. The propulsion shaft 226 extends generally horizontally through the lower unit 56 and is journaled for rotation. The propulsion device 41 is attached to the propulsion shaft 226. In the illustrated arrangement, the propulsion device includes a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The transmission 232 includes a transmission (not shown) that changes a rotational direction of the propeller 228 among forward, neutral or reverse. The transmission typically comprises a dog clutch and shift units that operate the dog clutch. At the forward and reverse positions, which are propulsion positions, the propeller 228 propels the watercraft 40 forward and backward, respectively. At the neutral position, which is a-non-propulsion position, the propeller 228 does not propel the watercraft 40 because the propulsion shaft 226 is disconnected from the driveshaft 222.

Preferably, the transmission is interconnected with the throttle valve linkage. A single control lever, which is the foregoing throttle lever, is connected with not only the throttle valve but also the transmission to control both of them in an interrelationship such that the throttle valve is always closed (or almost closed) when the transmission is placed in the neutral position by the transmission except for a racing operation. The throttle linkage can be released from the transmission for the racing operation.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then a discharge section defined within the hub of the propeller 228.

VVT Mechanism

With continued reference to FIGS. 2–5 and with additional reference to FIGS. 6 and 7, a VVT mechanism 240 is described below.

The VVT mechanism 240 preferably is configured to adjust the angular position of the intake camshaft 172 relative to the intake driven sprocket 188 between two limits, i.e., a fully advanced angular position and a fully retarded angular position. At the fully advanced angular position, the intake camshaft 172 opens and closes the intake valves 134 at a most advanced timing. In contrast, at the fully retarded angular position, the intake camshaft 172 opens and closes the intake valves 134 at a most retarded timing.

The VVT mechanism 240 preferably is hydraulically operated and thus comprises an adjusting section 242, a fluid supply section 244 and a control section 246. The adjusting section 242 sets the intake camshaft 172 to the certain angular position in response to a volume of working fluid that is allotted to two spaces of the adjusting section 242. The fluid supply section 244 preferably supplies a portion of the lubricant, which is used primarily for the lubrication system, to the adjusting section 242 as the working fluid. The control section 246 selects the rate or amount of the fluid directed to the adjusting section 242 under control of the ECU 201 (FIG. 8).

The adjusting section 242 preferably includes an outer housing 250 and an inner rotor 252. The outer housing 250 is affixed to the intake driven sprocket 188 by three bolts 254 in the illustrated arrangement and preferably forms three chambers 256 (FIG. 6) between the three bolts 254. Any other suitable fastening technique and any suitable number of chambers 256 can be used.

The inner rotor 252 is affixed atop the intake camshaft 172 by a bolt 258 and has three vanes 260 extending into the respective chambers 256 of the housing 250. The number of vanes 260 can be varied and the inner rotor 252 can be attached to the camshaft 172 in any suitable manners.

Figure 6:
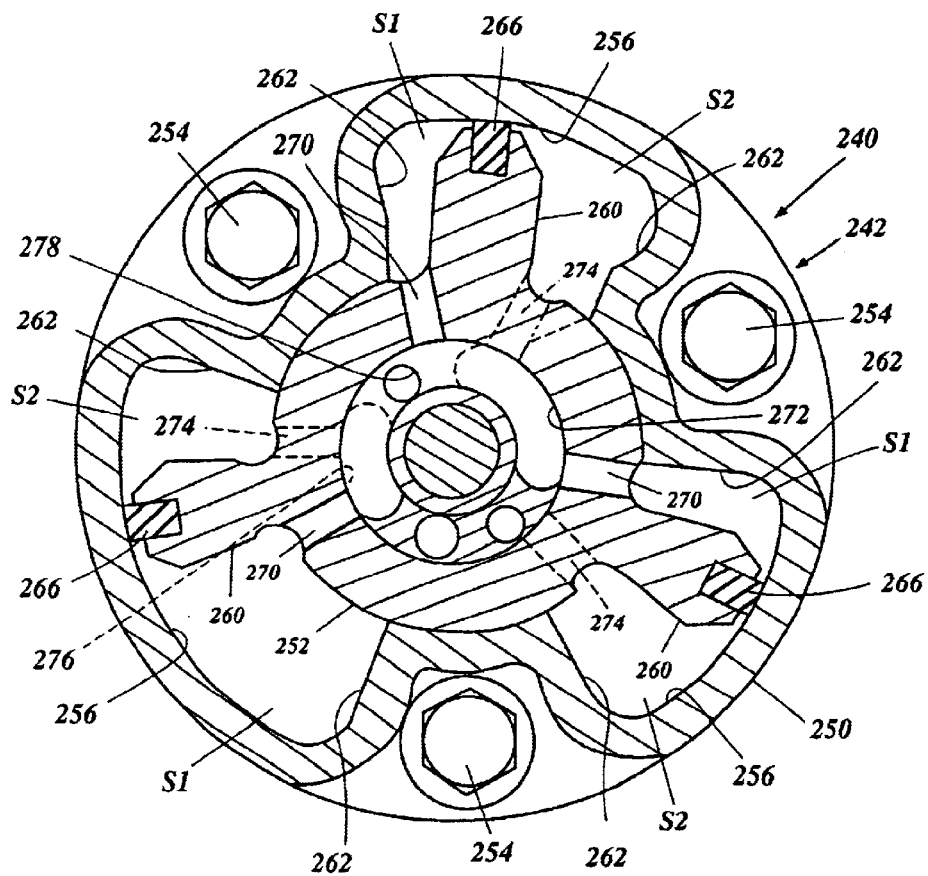
FIG. 6 is a sectional view of a variable camshaft adjusting mechanism taken along line 6—6 of FIG. 5.

With reference to FIG. 6, the vanes 260 preferably extend radially and are spaced apart from each other with an angle of about 120 degrees. The two sides of the vane 260, together with walls 262 of each chamber 256, define a first space S1 and a second space S2, respectively. Seal members 266 carried by the respective vanes 260 abuts an inner surface of the housing 250 and thereby substantially seal the first and second spaces S1, S2 from each other. The walls 262 of each chamber 256 also define stoppers which the vane 260 comes in contact with or abut on when a valve timing is set at either fully advanced or fully retarded position as described later.

The respective first spaces S1 communicate with one another through respective pathways 270 and a passage 272 that is formed on an upper surface of the rotor 252 and extends partially around the bolt 258. The respective second spaces S2 communicate with one another through pathways 274 and a passage 276 which is formed on a lower surface of the rotor 252 and extends partially around the bolt 258. The passages 272, 276 generally are configured as an incomplete circular shape and can be offset from one another (e.g., a 60 degree offset may be used).

A pathway 278 extends from the passage 272 to a bottom portion of the rotor 252 between the ends of the passage 276.

A cover member 280 is affixed to the outer housing 250 by screws 282 to cover the bolt 258. The passages 272, 276 allow fluid communication with the respective pathways 270, 274, 278 during rotation of the camshaft 172.

With reference to FIGS. 2 and 5, the fluid supply section 244 preferably includes a supply passage 284 and two delivery passages 286, 288. The supply passage 284 and the delivery passages 286, 288 communicate with one another through the control section 246. The supply passage 284 preferably has a passage portion 284a (FIGS. 2 and 5) defined in the cylinder head member 108 and a passage portion 284b (FIG. 2) defined in the bearing cap 176. The passage portion 284a is connected to the lubrication system, while the passage portion 284b is connected to the control section 246. Thus, the lubricant oil of the lubrication system is supplied to the control section 246 through the fluid supply passage 284.

The supply passage 284 communicates with the lubrication system so that a portion of the lubricant oil is supplied to the VVT mechanism 240 through the passage portions 284a, 284b. Because the passage portion 284a is formed by a drilling process in the illustrated embodiment, a closure member 290 closes one end of the passage portion 284a. The passage portion 284b is branched off to a camshaft lubrication passage 284c (FIG. 5) which delivers lubricant for lubrication of a journal of the camshaft 172.

The delivery passages 286, 288 preferably are defined in a top portion of the camshaft 172 and the bearing cap 176. A portion of the delivery passage 286 formed in the camshaft 172 includes a pathway 292 that extends generally vertically and that communicates with the pathway 278 that communicates with the passage 272 of the first space S1. The pathway 292 also communicates with a passage 294 that is formed as a recess in the outer surface of the camshaft 172.

A portion of the delivery passage 288 formed in the camshaft 172, in turn, includes a pathway 296 that extends generally vertically and communicates with the passage 276 of the second space S2. The pathway 296 also communicates with a passage 298 that is formed as a recess in the outer surface of the camshaft 172.

A portion of the delivery passage 286 formed in the bearing cap 176 includes a pathway 300 that extends generally vertically and generally horizontally to communicate with the passage 294. Similarly, a portion of the delivery passage 288 formed in the bearing cap 176 includes a pathway 302 that extends generally vertically and generally horizontally to communicate with the passage 298. The other ends of the pathways 300, 302 communicate with a common chamber 304 formed in the control section 246 through ports 306, 308, respectively.

A seal member 310 (FIG. 5) is inserted between the cylinder head member 108, the camshaft 172 and the bearing cap 176 to inhibit the lubricant from leaking out. It should be noted that FIGS. 5 and 7 illustrate the delivery passages 286, 288 in a schematic fashion. The passages 286, 288 do not merge together.

Figure 7:
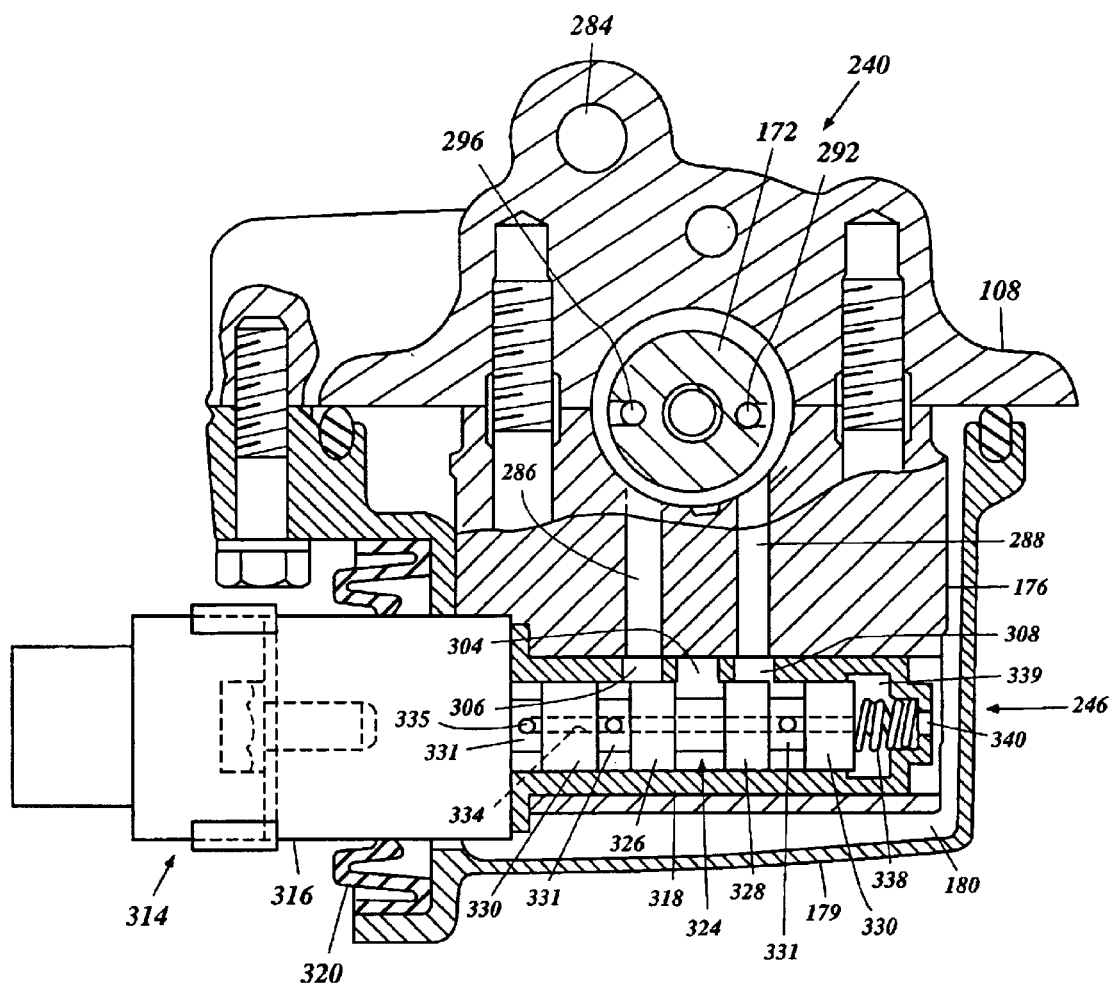
FIG. 7 is a sectional view of a variable camshaft adjusting mechanism control valve and actuator taken partially along line 7—7 of FIG. 5.

The control section 246 preferably includes an oil control valve (OCV) 314 (FIG. 7). The OCV 314 comprises a housing section 316 and a cylinder section 318. Both the housing and cylinder sections 316, 318 preferably are received in the bearing cap 176. Because the sections 316, 318 together extend through a hole of the camshaft cover 179, a bellow 320 made of rubber is provided between the housing section 316 and the camshaft cover 179 to close and seal the hole.

The cylinder section 318 defines the common chamber 304 that communicates with the supply passage 284 and the delivery passages 286, 288. The housing section 316 preferably encloses a solenoid type actuator, although other actuators of course are available.

A rod 324 extends into the common chamber 304 from the actuator and is axially movable therein. The rod 324 has a pair of valves 326, 328 and a pair of guide portions 330. The valves 326, 328 and the guide portions 330 have an outer diameter that is larger than an outer diameter of the remainder portions 331 of the rod 324 and is generally equal to an inner diameter of the cylinder section 318. The rod 324 defines an internal passage 334 extending through the rod 324 and apertures 335 communicating with the passage 334 and the common chamber 304 to allow free flow of the lubricant in the chamber 304.

A coil spring 338 is retained in a spring retaining space 339 at an end of the cylinder 318 opposite to the housing section 316 to urge the rod 324 toward the actuator. The lubricant can be drained to the camshaft chamber 180 through the spring retaining chamber 339 and a drain hole 340.

The actuator, i.e., solenoid, actuates the rod 324 under control of the ECU 201 (FIG. 8) so that the rod 324 can take any position in the chamber 304. More specifically, the solenoid pushes the rod 324 toward a position in compliance with commands of the ECU 201. If a certain position designated by the ECU 201 is closer to the solenoid than a current position, then the solenoid does not actuate the rod 324 and the coil spring 338 pushes back the rod 324 to the desired position. Alternatively, the solenoid pulls the rod 324 back to the position.

The valve 326 can close the port 306 entirely or partially, and the valve 328 can close the port 308 entirely or partially. The extent to which the valves 326, 328 allow the ports 306, 308 to communicate with the chamber 304 determines an amount of the lubricant that is allotted to each delivery passage 286, 288 and to each space S1, S2 in the adjusting section 242. The amount of lubricant delivered to each space S1, S2 thus determines an angular position of the camshaft 172. If more lubricant is allotted to the first space S1 than to the second space S2, the camshaft 172 is adjusted closer to the fully advanced position, and vise versa.

In operation, the oil pump pressurizes the lubricant oil to the supply passage 284 and further to the common chamber 304 of the cylinder 318. Meanwhile, the ECU 201 (FIG. 8) controls the solenoid. The solenoid moves the rod 324 and thus adjusts the degree to which the valves 326, 328 allow the chamber 304 to communicate with the ports 306, 308, respectively. The ECU thereby controls the angular position of the camshaft 172. Preferably, a drain is provided to allow the lubricant oil to drain from the space that is being evacuated while pressurized lubricant oil flows into the opposing space.

In one mode of operation, for example, the lubricant oil is fed to the common chamber 304 of the cylinder 318. Thus, the common chamber 304 has a positive pressure. To move the camshaft 172 in a first direction relative to the input sprocket 188, the common chamber 304 is linked with the delivery passage 286 while the other of the delivery passage 288 is linked to a drain. Thus, pressurized oil will flow into the first space S1 while oil will be displaced from the second space S2. The displaced oil flows through the passage 338 and to the drain 340 and thereby returns to the lubrication system. Once the desired movement has occurred, the rod 324 is returned to a neutral position in which the common chamber 304 is no longer communicating with either of the delivery passages 286, 288. Additionally, in the neutral position, neither of the delivery passages 286, 288 communicates with the drain in one particularly advantageous arrangement. Of course, by varying the placement and size of the seals, a constant flow can be produced from supply to drain while the rod 324 is in a neutral position. Also, a constant flow into the delivery lines also can be constructed. In the illustrated arrangement, however, no flow preferably occurs with the system in a neutral position.

The engine and the VVT mechanism are disclosed in, for example, a co-pending U.S. application filed Jun. 11, 2001, titled FOUR-CYCLE ENGINE FOR MARINE DRIVE, which Ser. No. is 09/878,323, issued Jan. 6, 2004 as U.S. Pat. No. 6,672,283, the entire content of which is hereby expressly incorporatedby reference.

The Engine Control System

With reference to FIG. 8, a valve timing control system of the VVT mechanism 40 using the ECU 201 will now be described below.

FIG. 8 schematically illustrates the engine 32. The illustrated ECU 201 controls the valve timing of the intake valves 134 by changing the angular positions of the intake camshaft 172 through the VVT mechanism 40. The ECU 201 also controls the fuel injectors 198 using the fuel injection control unit 202. The ECU 201 is connected to the OCV 314 as the control section 246 of the VVT mechanism 40 and to the fuel injectors through control signal lines.

In order to control the VVT mechanism 40 and the fuel injectors 198, the ECU can employ various sensors, which sense operational conditions of the engine 32 and/or the outboard motor 30. In the present system, the ECU 201 at least uses a camshaft angle position sensor 350, a crankshaft angle position sensor 352, a throttle position sensor (or throttle valve opening degree sensor) 354 and an intake or manifold air pressure sensor (MAP) 356. The ECU 201 is connected to the sensors 350, 352, 354, 356 through sensor signal lines.

The camshaft angle position sensor 350 is configured to sense an angular position of the intake camshaft 172 and to send an actual camshaft angular position signal to the ECU 201 through the signal line. The crankshaft angle position sensor 352 is configured to sense an angular position of the crankshaft 118 and to send a crankshaft angular position signal to the ECU 201 through the signal line. Both the camshaft angle position sensor 350 and the crankshaft angle position sensor 352 in the present system can be configured to generate pulses as the respective signals. The pulse of the camshaft position sensor 350 can give an actual angular position of the camshaft 172. The crankshaft position signal together with the camshaft position signal allows the ECU 201 to determine the position of the camshaft 172 in relation to the crankshaft 118.

The throttle position sensor 354 preferably is disposed atop the valve shaft 154 and is configured to sense an angular position between the open and closed angular positions of the throttle valves 152 and to send a throttle valve opening degree signal to the ECU 201 through the signal line.

The MAP sensor 356 preferably is disposed either within one of the intake passages 130 or within the plenum chamber 132 and is configured to sense an intake pressure therein. Because the respective intake passages 130 are formed such that each generally is the same size as the others, and because the plenum chamber 132 collects a large volume of air that is supplied to each of the intake passages 130, every passage 130 has substantially equal pressure and a signal of the MAP sensor 356 thus can represent a condition of the respective pressures. Thus, it should be appreciated that a single pressure sensor or multiple pressure sensors can be used.

The throttle valve position sensor 354 and the MAP sensor 356 preferably are selected from a type of sensor that indirectly senses an amount of air in the induction system. Another type of sensor that directly senses the air amount, of course, can be applicable. For example, moving vane types, heated-wire types and Karman Vortex types of air flow meters also can be used.

The operator's demand or engine load, as determined by the throttle opening degree, is sensed by the throttle position sensor 354. Generally, in proportion to the change of the throttle opening degree, the intake air pressure also varies and is sensed by the intake pressure sensor 356. The throttle valve 152 (FIG. 3) is opened when the operator operates the throttle lever to increase power output of the engine 32 and thus the speed of the watercraft 40. The intake pressure almost simultaneously decreases at the throttle valve 152 opens.

The engine load can also increase when the associated watercraft 40 advances against wind. In this situation, the operator also operates the throttle lever to recover the speed that may be lost. Therefore, as used in this description, the term "acceleration" means not only the acceleration in the narrow sense but also the recovery of speed by the operator in a broad sense. Also, the term "sudden acceleration" means the sudden acceleration in the narrow sense and a quick recovery of speed by the operator in a broad sense.

The signal lines preferably are configured with hard-wires or wireharnesses. The signals can be sent through emitter and detector pairs, infrared radiation, radio waves or the like. The type of signal and the type of connection can be varied between sensors or the same type can be used with all sensors which are described above and additional sensors described below.

Signals from other sensors or control signals also can be used for the control by the ECU 201. In the present control system, various sensors other than the sensors described above are also provided to sense the operational condition of the engine 32 and/or the outboard motor 30. For example, an oil pressure sensor 362, a water temperature sensor 364, an engine body temperature sensor 366, a knock sensor 368, an oxygen sensor 370 for determining a current air/fuel ratio, and an intake air temperature sensor 372 are provided in the present control system. The sensors can sense the operational conditions of the engine 32 and send signals to the ECU 201 through respective sensor signal lines. An ignition control signal 374, a fuel injection control signal 376, and an AAD control signal 378 are also used by the ECU 201 for control of the spark plugs 203 (FIG. 2), the fuel injectors 198, and the AAD (not shown), respectively. The foregoing sensors 350–372 and the control signals 374–378, in a broad sense, define sensors 380 that sense operational conditions of the engine and/or the outboard motor.

The ECU 201 can be designed as a feedback control device using the signals of the sensors. The ECU 201 preferably has a central processing unit (CPU) and at least one storage unit for storing various control maps defining relationships between parameters such as, for example, the engine speed, the throttle valve position and the intake pressure (and/or an amount of intake air) to determine desired control conditions. The ECU 201 then controls the VVT mechanism 40, the fuel injectors 198 and other actuators in accordance with the determined control condition.

The fuel injection control unit or "module" 202 can be in the form of a hard-wired circuit, a dedicated processor and memory, or a general purpose processor and memory running a control program. Other units or "modules", described below, can also be constructed as a hard-wired circuit, a dedicated processor and memory, or a general purpose processor and memory running one or more control programs. However, for easier understanding of the reader, the units will be described as if they were discriminate and substantial units. The illustrated fuel injection control unit 202 controls the fuel injectors 198 using at least the throttle position signal from the throttle position sensor 354 and the intake pressure signal from the intake pressure sensor 356.

The ECU 201 preferably comprises, other than the fuel injection control unit 202, an actual camshaft angular position calculation (ACAPC) unit 384, an engine speed calculation unit 386, a target camshaft angular position calculation (TCAPC) unit 388, and a control value calculation unit 390. The TCAPC unit 388 and the control value calculation unit 390 together form an OCV control section 392 in the illustrated ECU configuration.

The ACAPC unit 384 preferably receives the actual camshaft angular position signal from the camshaft angle position sensor 350 and the crankshaft angular position signal, which gives two possible ranges of camshaft angular position, from the crankshaft angle position sensor 352. The ACAPC unit 384 then calculates a deviation value which indicates how much the actual camshaft angular position deviates within the two possible ranges of camshaft angular position.

The engine speed calculation unit 386 receives the crankshaft angular position signal from the crankshaft angle position sensor 352 and calculates an engine speed using the signal versus time.

The TCAPC unit 388 receives the deviation value from the ACAPC unit 384, the engine speed from the engine speed calculation unit 386 and at least one of the throttle valve opening degree signal from the throttle valve position sensor 354 and the intake pressure signal from the intake pressure sensor 356. The TCAPC unit 388 then calculates a target camshaft angular position based upon the deviation value, the engine speed and either the throttle valve opening degree signal or the intake pressure signal.

The control value calculation unit 390 receives the target camshaft angular position from the TCAPC unit 388 and calculates a control value of the OCV 314 of the VVT mechanism 40. That is, the control value calculation unit 390 determines how much fluid should be delivered to either the space S1 or the space S2 of the adjusting section 242 of the VVT mechanism 40 based upon the target camshaft angular position. Generally, the ECU 201 sets the valve timing at the fully retarded position at least when the engine speed is relatively slow (under idle and trolling condition) to provide enhanced efficiency. Additionally, the timing can be retarded at speeds nearing the upper engine speed limit. For example, the timing can be retarded as speeds less than 800 rpm (at idle, 700–800 rpm, and at trolling, 650–750 rpm) and at speeds of more than 6,000 rpm.

Under a normal running condition and an ordinary acceleration condition (i.e., not sudden acceleration condition), the ECU 201 preferably uses either a combination of the throttle valve opening degree signal with the engine speed signal ($\alpha$-N method) or a combination of the intake pressure signal with the engine speed signal (D-j method) to calculate the target camshaft angular position. Otherwise, the ECU 201 can use a mixed combination of the $\alpha$-N method and the D-j method under the normal running condition or the ordinary acceleration condition. The $\alpha$-N method, the D-j method and the mixed combination thereof are disclosed in, for example, a co-pending U.S. application filed Feb. 14, 2002, titled CONTROL SYSTEM FOR MARINE ENGINE, which serial number is 10/078,275, issued Nov. 18, 2003 as U.S. Pat. No. 6,648,706, the entire contents of which is hereby expressly incorporated by reference. An air amount signal sensed by the air flow meter noted above can be applied additionally or instead either the intake pressure signal or the throttle opening degree signal.

Under a sudden acceleration condition, the illustrated ECU 201 uses only the throttle opening degree signal. That is, the ECU 201 always determines, at least prior to controlling the OCV 314 with the OCV control section 392, whether the operator wishes sudden acceleration or not. The sudden acceleration condition preferably is determined when a change rate of the throttle opening degree signal, a change rate of the intake pressure signal or a change rate of the engine speed calculated by the engine speed calculation unit 386 becomes greater than a predetermined magnitude. A change rate of the air amount signal also can be used to determine the sudden acceleration condition. Theoretically, the predetermined magnitude can be set at any magnitude larger than zero.

In order to reduce shock, make the transmission easier to shift, and to reduce the time lag generated when the engine 32 has been raced with the transmission in a neutral position, the ECU 201 in the present control system employs a control strategy, an illustrative example of which is described below.

A presently preferred control system is schematically illustrated in FIG. 8. The system includes a control value adjustment unit 400 that adjusts an output of the control value calculation unit 390, a transmission position sensor 402, and a transmission position change operation sensor 404.

The transmission position sensor 402 is configured to sense whether the transmission 232 (FIG. 1) is in the forward, neutral or reverse position. The transmission position sensor 402 is also configured to send a transmission position signal to the control value adjustment unit 400 through the signal line.

The transmission position change operation sensor 404 senses a transitional condition under which the transmission 232 is operated to change to the forward, neutral or reverse position from another position by the operator and sends a transmission position change operation signal to the control value adjustment unit 400 through the signal line. The transmission position change operation sensor 404 can comprise, for example, but without limitation, a torsion torque sensor disposed at a node portion of a shift linkage of the transmission. The torsion torque sensor can send the transmission position change operation signal when a torsion torque of the node portion exceeds a preset torque. This situation occurs when the transmission cannot be changed to the neutral position from the forward or reverse positions. Alternatively, a load sensor can be disposed on a shift cable of the mechanism. The load sensor can detect a change of load when the transmission is operated.

Both the torsion torque sensor and the load sensor are configured to sense if the operational load exerted upon a portion of the transmission exceeds a preset magnitude. Alternatively, a proximity sensor unit comprising a magnet disposed on a portion of the transmission and a reed switch disposed adjacent to the magnet can be used.

Additionally, the illustrated ECU 201 uses the throttle position sensor 354 as a sensor which senses an operational condition of the engine 32. The ECU 201 preferably is configured to determine whether the engine 32 is operating in a low speed based on the throttle opening degree sensed by the sensor 354, e.g. when the opening degree is less than a preset magnitude.

The ECU 201 can use other sensors solely or in combination with the throttle position sensor 354 as a sensor which senses the operational condition of the engine 32. For example, the intake pressure sensor 356, the air amount sensor (not shown) and the crankshaft angle position sensor 352 are applicable. This is because the crankshaft angle position sensor 352 can give an engine speed together with the engine speed calculation unit 386, and the intake pressure sensor 356 and the air amount sensor can give a value generally in proportion to the engine speed, like the throttle position sensor 354.

Figure 9:
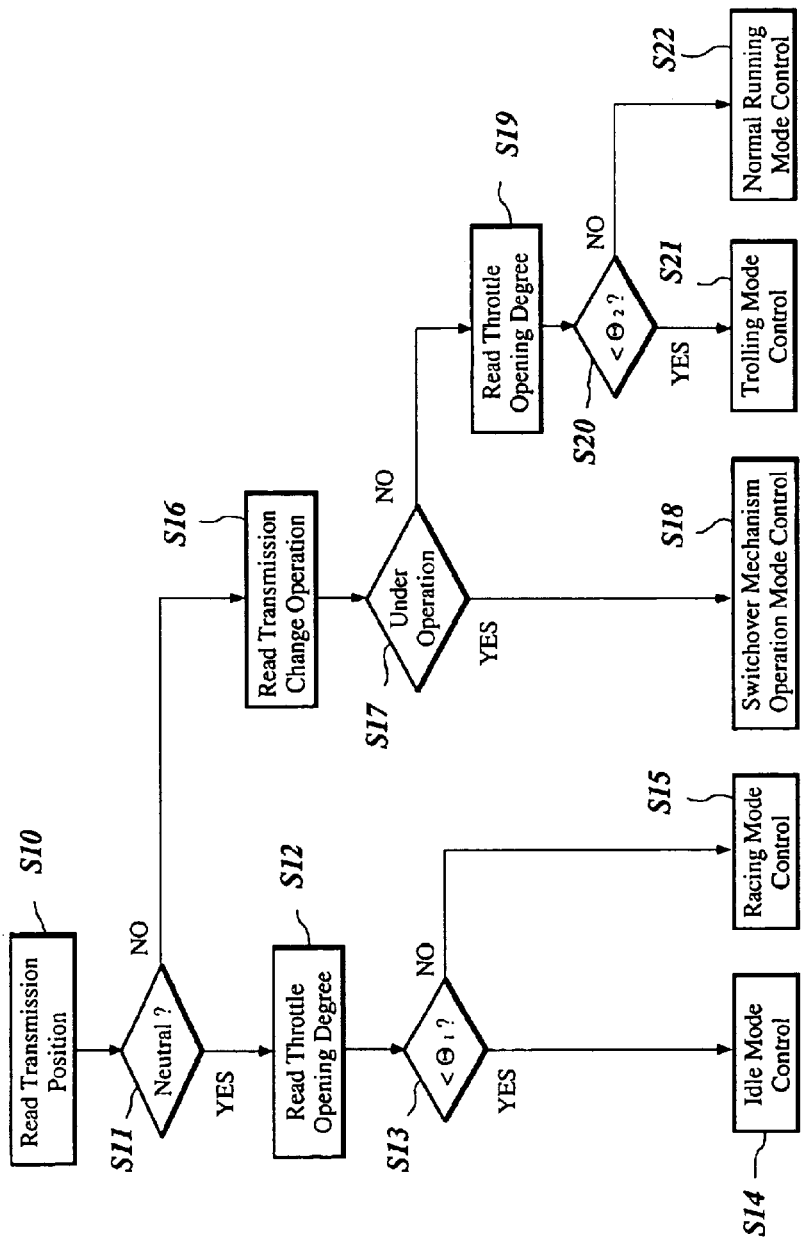
FIG. 9 is a flow chart illustrating a control routine for controlling the VVT mechanism.

FIG. 9 schematically illustrates an exemplary flow chart of a control routine used by the ECU 201.

At the step S10, the transmission position is determined. For example, ECU 201 can sample or "read" the output of the the transmission position sensor 402. After the step S10, the routine proceeds to a step S11.

At the step S11, it is determined whether the transmission 232 is in the neutral position. For example, the ECU 201 can compare the output read in step S10 to a predetermined value corresponding to the neutral position. If the transmission is in the neutral position, the routine moves to a step S12.

At the step S12, a throttle opening degree is determined. For example, the ECU 201 can sample the output of the throttle position sensor 354. After the step S12, the routine moves to a step S13.

At the step S13, it is determined whether the throttle opening degree is less than a predetermined degree $\theta_1$, for example, one (1) degree. For example, the ECU 201 can compare the output read in the step S12 to the predetermined output value $\theta_1$. Alternatively, the ECU 201 can determine if the throttle opening degree is zero. An affirmative determination means that the engine 32 is operating under an idle speed mode. After the step S13, the routine moves to a step S14.

As the step S14, the engine 32 is operated according to an idle speed mode. In this mode, the engine speed is about 700–800 rpm, as described above. Additionally, the control value adjustment unit 400 of the ECU 201 sends a control signal to the OCV 314 to fix the camshaft angular timing at the fully retarded position. Preferably, a sufficient fluid amount, i.e., more than an ordinary amount of the fluid, is delivered to the spaces S2. This amount of fluid is sufficient to press the vanes 260 against the stoppers 262 such that the vanes 260 cannot vibrate.

If, at the step S13, the determination is negative, the engine 32 is operating in a racing mode. Thus, the routine moves to a step S15.

At the step S15, the camshaft timing is adjusted to the fully retarded position. For example, the ECU 201 can send a control signal to the OCV 314 to fix the camshaft angular timing at the fully retarded position, regardless of engine speed. This is advantageous because the valve timing can be kept at the fully retarded position which will be the desired valve timing at the moment the transmission is shifted into a drive position. Normally, adjustment of the valve timing is not necessary in the racing mode since the transmission is in a neutral position and thus, the load on the engine remains low. Thus, the fully retarded position is satisfactory for the racing mode.

It should be noted that pressing the vanes 260 to the stoppers 262 is not necessary. For example, the time lag will be prevented as along as the vanes 260 are brought into contact with or at least adjacent to the stoppers 262.

Alternatively, however, the control value adjustment unit 400, at the step S15, can allow the output of the control value of the control value calculation unit 390 to be sent to the OCV 314. Under this alternative control, the OCV 314 sets the camshaft angular timing at a position between the fully retarded and fully advanced position given by the control value calculation unit 390 according to engine speed and/or load.

Additionally, in another alternative, the ECU 201 can immediately fix the VVT mechanism 40 to the fully retarded position when the determination at the step S11 is affirmative without determining whether the throttle opening degree is less than the preset degree $\theta_1$.

With reference to the step S18, if the determination at this step is negative, the program moves to a step S16.

At the step S16, a transmission position change operation is detected. For example, the ECU 201 can sample the output of the using the transmission position change operation sensor 404. After the step S16, the routine moves to a step S17.

At the step S17, it is determined whether the transmission is being shifted. For example, the ECU 201 can compare the output sampled in the step S16 to a predetermined value indicative of the shifting of the transmission. The predetermined values indicate that the transmission is being shifted into forward, neutral or reverse. If this determination is affirmative, the routine moves to a step S18.

At the step 18, the camshaft timing is adjusted to an advanced timing relative to the fully retarded timing. Preferably, the camshaft timing is set to a timing that lowers the power output of the engine so as to reduce the load on the tansmission components, which thereby makes it easier to shift the transmission and reduces the shock imparted to the drive train. Additionally, the camshaft timing is set such that the engine 32 does not stall. However, it is to be noted that the time during which the camshaft timing is set to the advanced position can be short. Thus, the camshaft timing can be set to such an advanced timing that the engine would eventually reach an unacceptably unstable state if such a timing was maintained for longer than the duration of the step S18.

As an example of the operation performed during the step S18, the illustrated control value adjustment unit 400, can send a control signal to the OCV 314 to set the camshaft angular timing to more advanced timing rather than a more optimum timing originally determined by the control value calculation unit 390.

In an illustrative, but non-limiting example, the total angular range between the fully retarded position and the fully advanced position is 40 degrees. Thus, the advance angle set in step S18 preferably is 10 degrees from the fully retarded position. With this timing advancement, the engine begins to run in an unstable state, but continues to run, at least during the duration of step S18. This unstable running condition produces a lower torque than that produced during normal idle speed operation. Thus, the operator can more easily operate the transmission with less effort.

Alternatively, if the ECU 201 sets the camshaft angular position to the fully advanced position or a relatively advanced position in some controls, and the engine operation is stable and the torque is large at this position, the control value adjustment unit 400, at the step S18, can send a control signal to the OCV 314 to set the camshaft angular timing to more retarded, and less optimal, position.

If the determination at the step S17 is negative, the program goes to a step S19. At the step S19, the trottle opening is detected. For example, the ECU 201 can sample the output from the throttle position sensor 354. After the step S19, the routine moves to a step S20.

At the step S20, it is determined whether the throttle position detected in the step S19 is less than a preset magnitude $\theta_2$ (for example, three (3) degrees). The opening degree $\theta_2$ can be the same as the opening degree $\theta_1$. Alternatively, the ECU 201 can determine whether the throttle opening degree is zero, which can be a more simple calculation. If the determination is affirmative, the routine moves to a step S21.

At the step 21, the engine 32 is controlled to operate in a trolling mode. For example, a trolling speed operation is when the engine 32 is allowed to operate at idle speed with the transmission in a drive position, i.e., forward or reverse. Under this condition, the propeller 228 can rotate and accordingly the outboard motor 30 can propel the watercraft 40 in at a slow speed. In a trolling mode, engine speed is, for example, 650–750 rpm, as described above. In an illustrative example, the ECU 201 sends a control signal to the OCV 314 to fix the camshaft angular timing at the fully retarded position. Preferably, the signal is configured to cause the OCV 314 to bias the vanes 260 against the stoppers 262 such that the vanes 260 cannot vibrate.

If the determination at the step S20 is negative, the routine moves to a step S22. At the step S22, the engine 32 is controlled to operate in a normal mode. For example, the control value adjustment unit 400 allows the output of the control value of the control value calculation unit 390 to be sent to the OCV 314. The OCV 314 thus sets the camshaft timing at a position between the fully retarded and fully advanced position given by the control value calculation unit 390.

If the engine continuously operates in a high speed mode such as, for example, 6,000 rpm or more in the normal running mode, the OCV 314 sets the camshaft timing at the fully retarded position and the vanes 260 can repeatedly hit the stoppers. The program of the ECU 201 thus can have a further step (not shown) to determine whether the throttle opening degree is fixed to the fully opened position (or almost fully opened position) for a preset period time and/or the target camshaft angular position is set at the fully retarded position for the period of time or another preset period of time. If the determination of this additional step is affirmative, the control value adjustment unit 400 of the ECU 201 can send a control signal to the OCV 314 to coercively fix the camshaft angular timing at the fully retarded position. Alternatively, this additional control can be executed if the engine speed exceeds a certain predetermined speed or an engine load exceeds a certain predetermined magnitude.

As thus described, in the present control system, the camshaft angular timing can be set at more advanced timing (or more retarded timing) rather than an optimum timing that is originally given by the control value calculation unit when the transmission is being shifted. The engine operation thus is brought to an unstable state (mostly, with torque fluctuation) and also the torque is lowered, thereby allowing the operator to more easily operate the transmission with less effort.

In addition, also in the present control system, the valve timing can be kept at the fully retarded position whenever the transmission is in the neutral position. This prevents a time lag that would otherwise be generated if the engine is raced with the transmission in the neutral position, the shifted into a drive position.

After completion of steps S14, S15, S18, S21, and S22, the routine can then return to step S10 and repeat.

Of course, the foregoing description is that of preferred controls having certain features, aspects and advantages in accordance with the present invention. For instance, the VVT mechanism can be provided at the exhaust camshaft rather than the intake camshaft, or at both of the intake and exhaust camshafts. Accordingly, various changes and modifications also may be made to the above-described controls without departing from the spirit and scope of the invention, as defined by the claims.

What is claimed is:

1. A marine drive comprising an internal combustion engine, a propulsion device powered by the engine, and a transmission configured to shift the propulsion device between a neutral position and a drive position, the engine comprising an engine body, a movable member movable relative to the engine body, the engine body and the movable member together defining a combustion chamber, the engine body defining at least one intake port and at least one exhaust port communicating with the combustion chamber, an air induction system communicating with the combustion chamber through the at least one intake port, an exhaust system communicating with the combustion chamber through the at least one exhaust port, an intake valve arranged to move between an open position and a closed position relative to the intake port, an exhaust valve arranged to move between an open position and a closed position relative to the exhaust port, a value actuator configured to actuate either the intake valve or the exhaust valve, a change mechanism configured to change an actuating timing of the valve actuator at which the valve actuator actuates the intake valve or the exhaust valve, a control device configured to control the change mechanism to set the actuating timing at a first timing, and a sensor configured to sense whether the transmission is being shifted and to send a signal to the control device, the control device being configured to control the change mechanism based upon the signal to move the actuating timing away from the first timing, without adjusting valve lift.

2. A marine drive comprising an internal combustion engine, a propulsion device powered by the engine, and a transmission configured to shift the propulsion device between a neutral position and a drive position, the engine comprising an engine body, a movable member movable relative to the engine body, the engine body and the movable member together defining a combustion chamber, the engine body defining at least one intake port and at least one exhaust port communicating with the combustion chamber, an air induction system communicating with the combustion chamber through the at least one intake port, an exhaust system communicating with the combustion chamber through the at least one exhaust port, an intake valve arranged to move between an open position and a closed position relative to the intake port, an exhaust valve arranged to move between an open position and a closed position relative to the exhaust port, a value actuator configured to actuate either the intake valve or the exhaust valve, a change mechanism configured to change an actuating timing of the valve actuator at which the valve actuator actuates the intake valve or the exhaust valve, a control device configured to control the change mechanism to set the actuating timing at a first timing, a timing sensor configured to sense an actual timing of the valve actuator and to send an actual timing signal to the control device, the control device being configured to determine a target timing of the valve actuator as the first timing, and a sensor configured to sense whether the transmission is being shifted and to send a signal to the control device, the control device being configured to control the change mechanism to adjust the actual timing toward the target timing when the signal is not sent to control device, and the control device being configured to control the change mechanism based upon the signal to move the actuating timing away from the first timing.

3. The marine drive as set forth in claim 2, wherein the control device is configured to control the change mechanism to move the actuating timing to a more retarded timing than the first timing.

4. The marine drive as set forth in claim 1, wherein the control device is configured to control the change mechanism to move the actuating timing to a more retarded timing than the first timing.

5. A marine drive comprising an internal combustion engine, a propulsion device powered by the engine, and a transmission configured to shift the propulsion device between a neutral position and a drive position, the engine comprising an engine body, a movable member movable relative to the engine body, the engine body and the movable member together defining a combustion chamber, the engine body defining at least one intake port and at least one exhaust port communicating with the combustion chamber, an air induction system communicating with the combustion chamber through the at least one intake port, an exhaust system communicating with the combustion chamber through the at least one exhaust port, an intake valve arranged to move between an open position and a closed position relative to the intake port, an exhaust valve arranged to move between an open position and a closed position relative to the exhaust port, a valve actuator configured to actuate either the intake valve or the exhaust valve, change mechanism configured to change an actuating timing of the valve actuator at which the valve actuator actuates the intake valve or the exhaust valve, a control device configured to control the change mechanism to set the actuating timing at a first timing, and a sensor configured to sense whether the transmission is being shifted and to send a signal to the control device, the sensor being configured to sense whether an operational load exerted upon a portion of the transmission exceeds a predetermined magnitude, the control device being configured to control the change mechanism based upon the signal to move the actuating timing away from the first timing.

6. A marine drive comprising an internal combustion engine, a propulsion device powered by the engine, and a transmission configured to shift the propulsion device between a neutral position and a drive position, the engine comprising an engine body, a crankshaft journaled for rotation at least partially in the engine body, a movable member movable relative to the engine body, the engine body and the movable member together defining a combustion chamber, the engine body defining at least one intake port and at least one exhaust port communicating with the combustion chamber, an air induction system communicating with the combustion chamber through the at least one intake port, an exhaust system communicating with the combustion chamber through the at least one exhaust port, an intake valve configured to move between an open position and a closed position relative to the intake port, an exhaust valve arranged to move between an open position and a closed position relative to the exhaust port, a valve actuator configured to actuate either the intake valve or the exhaust valve, the valve actuator comprising a camshaft journaled on the engine body for rotation, the camshaft defining a cam lobe configured to actuate the intake or exhaust valve, a change mechanism configured to change an actuating timing of the valve actuator at which the valve actuator actuates the intake valve or the exhaust valve, the change mechanism being configured to change an angular position of the camshaft relative to the crankshaft, a control device configured to control the change mechanism to set the actuating timing at a first timing, and a sensor configured to sense whether the propulsion device is being shifted and to send a signal to the control device, the control device being configured to control the change mechanism based upon the signal to move the actuating timing away from the first timing.

7. A marine drive comprising an internal combustion engine, a propulsion device powered by the engine, and a transmission configured to shift the propulsion device between a neutral position and a drive position, the engine comprising an engine body, a movable member movable relative to the engine body, the engine body and the movable member together defining a combustion chamber, the engine body defining intake and exhaust ports communicating with the combustion chamber, an air induction system communicating with the combustion chamber through the intake port, an exhaust system communicating with the combustion chamber through the exhaust port, an intake valve configured to move between an open position and a closed position of the intake port, an exhaust valve configured to move between an open position and a closed position of the exhaust port, a valve actuator configured to actuate either the intake valve or the exhaust valve, a change mechanism configured to change an actuating timing of the valve actuator at which the valve actuator actuates the intake valve or the exhaust valve, a control device configured to control the change mechanism to set the actuating timing at a first timing, and a sensor configured to sense whether the propulsion device is in the neutral position and to send a signal to the control device, the control device being configured to control the change mechanism based upon the signal to adjust the actuating timing of the actuator to a generally fully retarded or an advanced timing.

8. The marine drive as set forth in claim 7 additionally comprising a timing sensor configured to sense an actual timing of the valve actuator and to send an actual timing signal to the control device, the control device being configured to determine a target timing of the valve actuator as the first timing, the control device being configured to control the change mechanism to adjust the actual timing toward to the target timing when the signal is not sent to the control device.

9. The marine drive as set forth in claim 7 additionally comprising a crankshaft journaled for rotation at least partially in the engine body, wherein the valve actuator includes a camshaft journaled on the engine body for rotation, the camshaft defines a cam lobe actuating the intake or exhaust valve, the change mechanism being configured to change an angular position of the camshaft relative to the crankshaft.

10. A method for controlling a marine drive having a transmission configured to shift a propulsion device between a propulsion operating condition and a non-propulsion operating condition, an internal combustion engine including intake and exhaust valves, a valve actuator configured to actuate the intake and exhaust valves, and a change mechanism configured to change an actuating timing of the valve actuator at which the valve actuator actuates at least one of intake valve and the exhaust valve, the method comprising setting the actuating timing at a first timing, determining whether the transmission is being shifted, and controlling the change mechanism to move the actuating timing away from the first timing when the determination is affirmative without adjusting valve lift.

11. A method for controlling a marine drive having a transmission configured to shift a propulsion device between a propulsion condition and a non-propulsion condition, an internal combustion engine including intake and exhaust valves, a valve actuator configured to actuate the intake and exhaust valves, and a change mechanism configured to change an actuating timing of the valve actuator at which the valve actuator actuates at least one of the intake and exhaust valves, the method comprising setting the actuating timing at a first timing, determining whether the transmission is being shifted, controlling the change mechanism to move the actuating timing away from the first timing when the determination is affirmative, sensing an actual timing of the valve actuator, setting a target timing of the valve actuator as the first timing, and controlling the change mechanism to adjust the actual timing toward the target timing when the determination is negative.

12. The method as set forth in claim 11, wherein controlling the change mechanism comprises moving the actuating timing to a more retarded timing than the first timing.

13. The method as set forth in claim 10, wherein controlling the change mechanism comprises moving the actuating timing to a more retarded timing than the first timing.

14. A method for controlling a marine drive having a propulsion device, an internal combustion engine including intake and exhaust valves, a valve actuator configured to actuate the intake and exhaust valves, and a change mechanism configured to change an actuating timing of the valve actuator at which the valve actuator actuates at least one of the intake valve and the exhaust valve, the method comprising setting the actuating timing at a generally optimum timing, determining whether the propulsion device is in a non-propulsion operating condition, and controlling the change mechanism to bring the actuating timing to a generally fully retarded or advanced position when the determination is affirmative.

15. The method set forth in claim 14 additionally comprising sensing an actual timing of the valve actuator, setting a target timing of the valve actuator as the optimum timing, and controlling the change mechanism to bring the actual timing close to the target timing when the determination is negative.

16. A marine drive comprising an internal combustion engine, a propulsion device powered by the engine, and a transmission configured to shift the propulsion device between a neutral position and a drive position, the engine comprising an engine body, a movable member movable relative to the engine body and driving a crankshaft, the engine body and the movable member together defining a combustion chamber, the engine body defining at least one intake port and at least one exhaust port communicating with the combustion chamber, an air induction system communicating with the combustion chamber through the at least one intake port, an exhaust system communicating with the combustion chamber through the at least one exhaust port, an intake value arranged to move between an open position and a closed position relative to the intake port, an exhaust valve arranged to move between an open position and a closed position relative to the exhaust port, a camshaft driven in a rotational phase relationship with the crankshaft and configured to actuate either the intake valve or the exhaust valve, means for changing the rotational chase relationship so as to reduce a load on the transmission while the transmission is being shifted.

* * * * *

UNITED STATES PATENT AND TRADEMARK OFFICE
CERTIFICATE OF CORRECTION

PATENT NO.       : 6,800,002 B2                                               Page 1 of 1
APPLICATION NO.  : 10/188691
DATED            : October 5, 2004
INVENTOR(S)      : Goichi Katayama et al.

It is certified that error appears in the above-identified patent and that said Letters Patent is hereby corrected as shown below:

At Column 22, Line 33, in Claim 1, please delete "value" and insert --valve--

At Column 22, Line 61, in Claim 2, please delete "value" and insert --valve--

At Column 23, Line 8, in Claim 2, after "sent to", please insert --the--

At Column 23, Line 37, in Claim 5, after "valve", please insert --a--

At Column 24, Line 67, in Claim 10, after "one of", please insert --the--

At Column 26, Line 7, in Claim 15, after "method", please insert --as--

At Column 26, Line 26, in Claim 16, please delete "value" and insert --valve--

At Column 26, Line 32, in Claim 16, please delete "chase" and insert --phase--

Signed and Sealed this

Nineteenth Day of December, 2006

JON W. DUDAS
*Director of the United States Patent and Trademark Office*